US008251317B2

(12) United States Patent
Pitt

(10) Patent No.: US 8,251,317 B2
(45) Date of Patent: Aug. 28, 2012

(54) SYSTEM AND METHOD FOR VARYING THE POROSITY OF AN AERODYNAMIC SURFACE

(75) Inventor: Dale M. Pitt, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 1017 days.

(21) Appl. No.: 12/105,450

(22) Filed: Apr. 18, 2008

(65) Prior Publication Data

US 2009/0261204 A1 Oct. 22, 2009

(51) Int. Cl.
*B64C 21/00* (2006.01)
*B64C 21/02* (2006.01)
*B64C 21/08* (2006.01)

(52) U.S. Cl. ............... 244/204; 244/200; 244/208

(58) Field of Classification Search ........... 244/200, 244/200.1, 201, 204, 204.1, 123.14, 99.8, 244/35 A, 209, 208, 207
See application file for complete search history.

(56) References Cited

U.S. PATENT DOCUMENTS

| | | | | |
|---|---|---|---|---|
| 1,889,477 | A | * | 11/1932 | Hitt ............................ 244/204 |
| 4,522,360 | A | * | 6/1985 | Barnwell et al. ............... 244/204 |
| 5,971,327 | A | * | 10/1999 | Loth ............................ 244/204 |
| 6,079,671 | A | * | 6/2000 | O'Neil et al. ................ 244/204 |
| 6,283,406 | B1 | * | 9/2001 | Remington et al. ....... 244/204.1 |
| 6,368,059 | B1 | * | 4/2002 | Maines ........................ 415/914 |
| 6,612,524 | B2 | * | 9/2003 | Billman et al. ............... 244/200 |
| 6,866,233 | B2 | * | 3/2005 | Patel et al. .................... 244/204 |
| 7,059,664 | B2 | * | 6/2006 | Aase et al. .................. 244/204.1 |
| 7,147,271 | B2 | * | 12/2006 | Aase et al. .................... 244/204 |

OTHER PUBLICATIONS

Mark A. Gillan, "Computational Analysis of Drag Reduction and Buffet Alleviation in Viscous Transonic Flows Over Porous Airfoils," 1993, American Institute of Aeronautics and Astronautics, AIAA-93-3419.
James D. Revell et al., "Trailing-Edge Flap Noise Reduction by Porous Acoustic Treatment," 1997, American Institute of Aeronautics and Astronautics, AIAA-97-1646.
Mineck et al., "Effect of Full-Chord Porosity on Aerodynamic Characteristics of the NACA 0012 Airfoil," NASA Technical Paper 3591, Apr. 1996.

* cited by examiner

*Primary Examiner* — Tien Dinh
*Assistant Examiner* — Richard R Green
(74) *Attorney, Agent, or Firm* — Novatech IP Law

(57) ABSTRACT

A variable porosity system for an aircraft includes a first layer, a second layer and an actuator mechanism. Each of the first and second layers has at least one pore and are slidable relative to one another. The actuator mechanism is operative to move the first and second layers relative to one another such that the pores are movable into and out of at least partial alignment with one another to allow for fluid communication therebetween. At least one of the first and second layers is substantially continuous with an outer mold line surface of an aerodynamic member such as an aircraft wing. The actuator mechanism is configured to modulate the frequency of the opening and closing of the pores with respect to flight conditions of an aircraft.

19 Claims, 9 Drawing Sheets

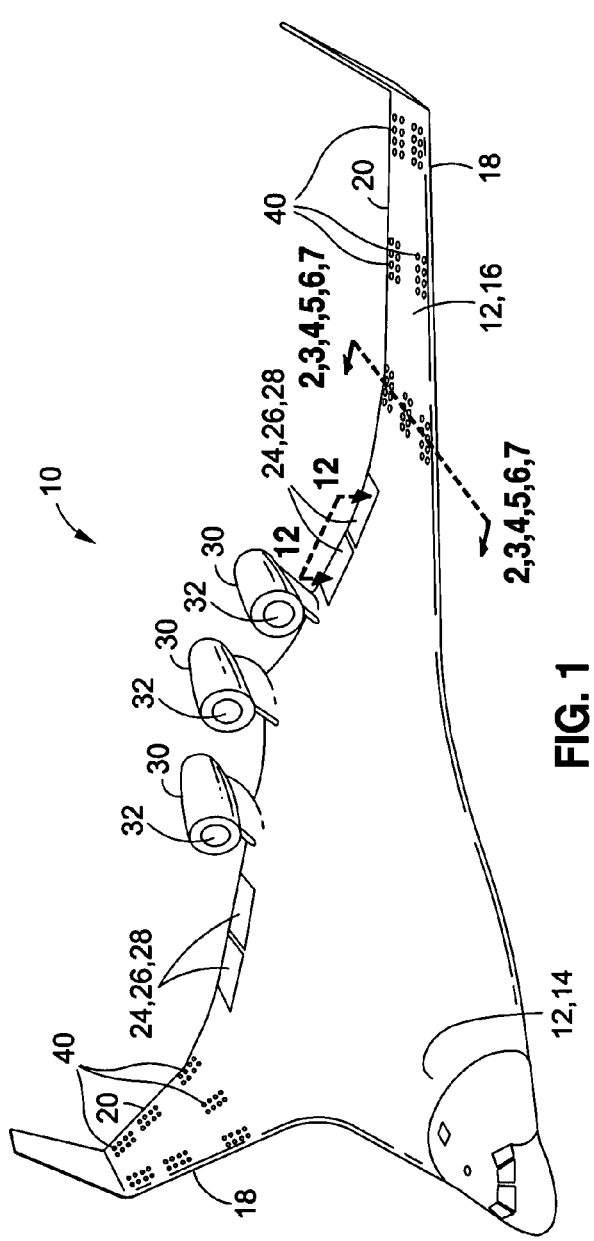
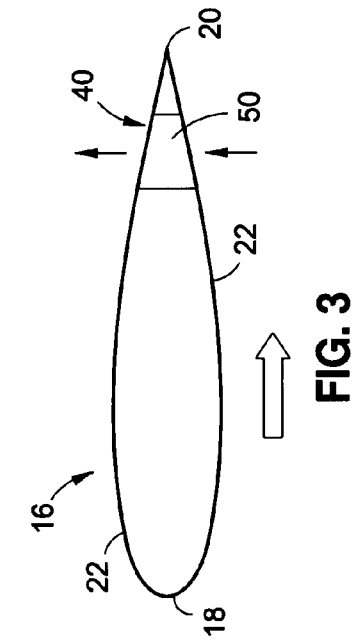
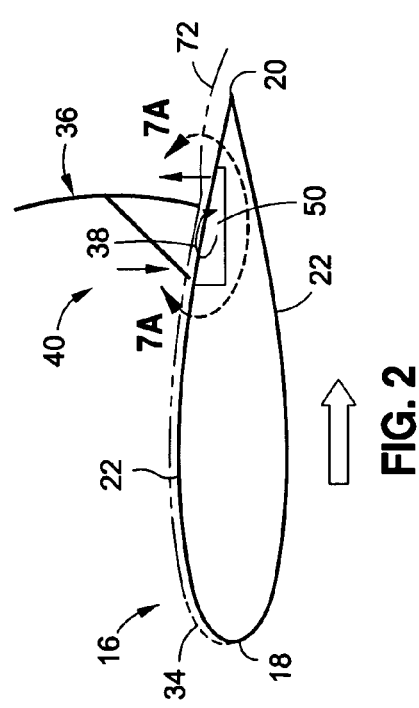
FIG. 1
FIG. 3
FIG. 2

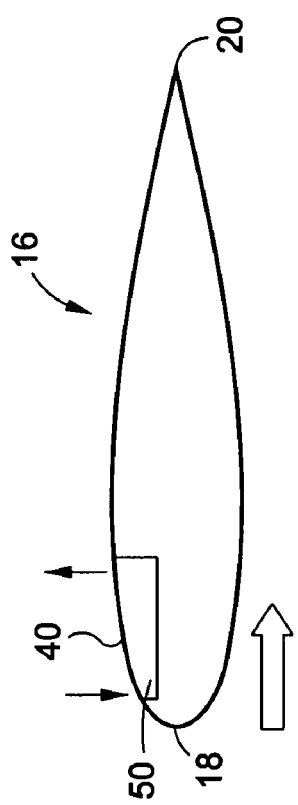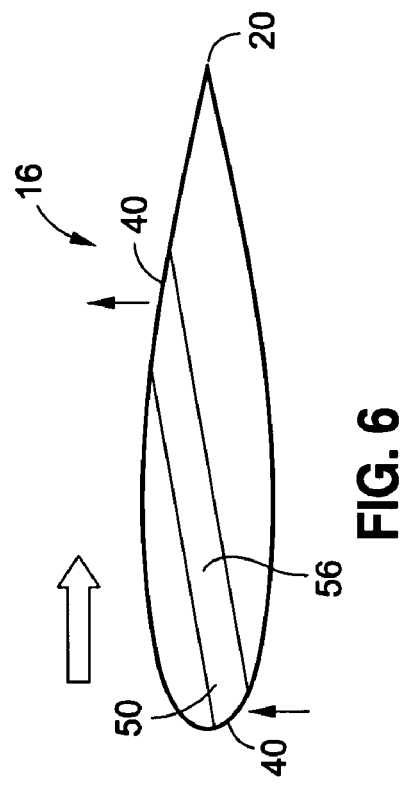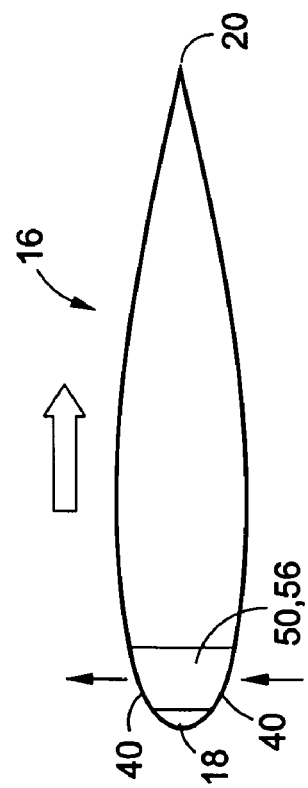

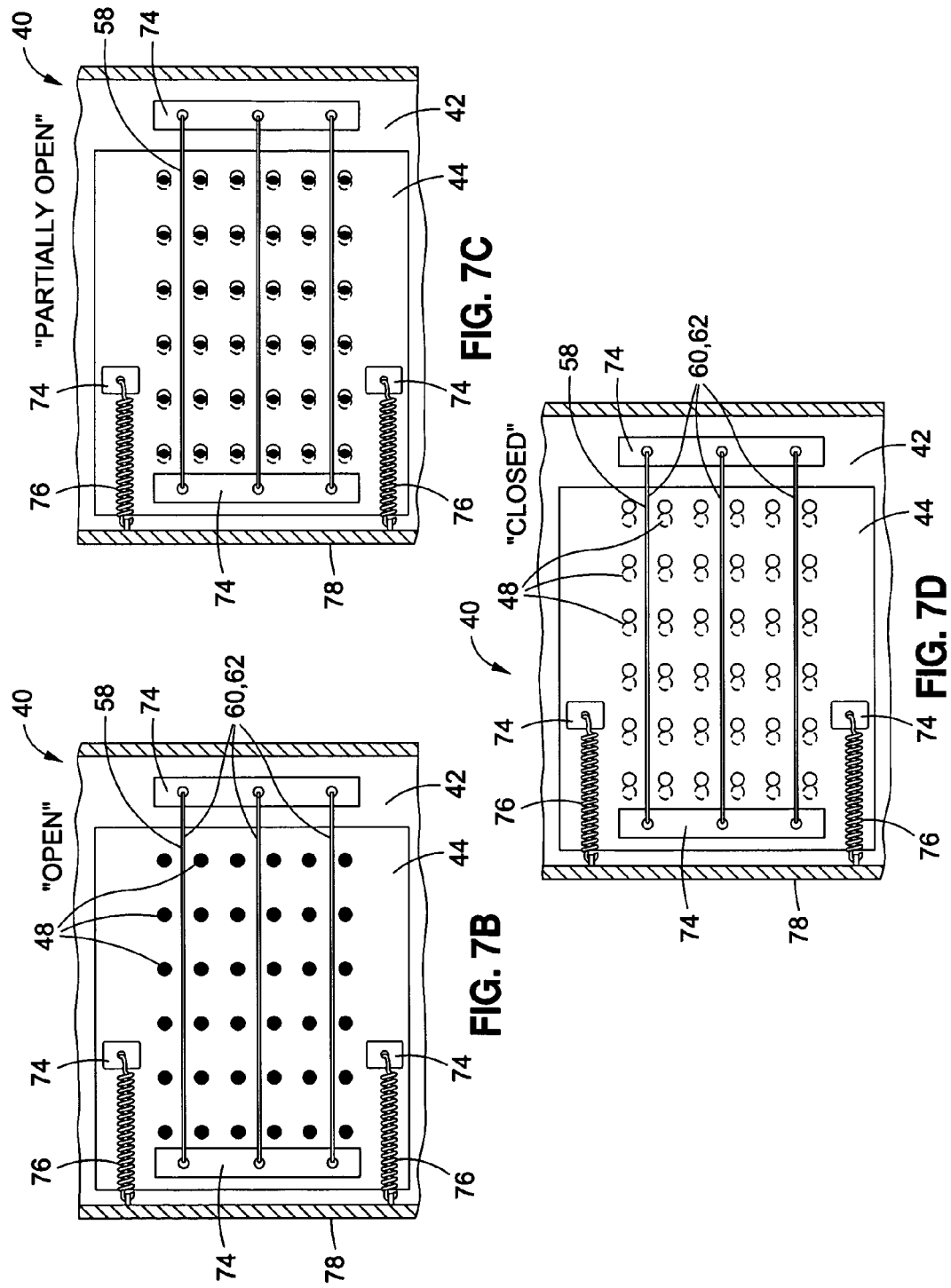

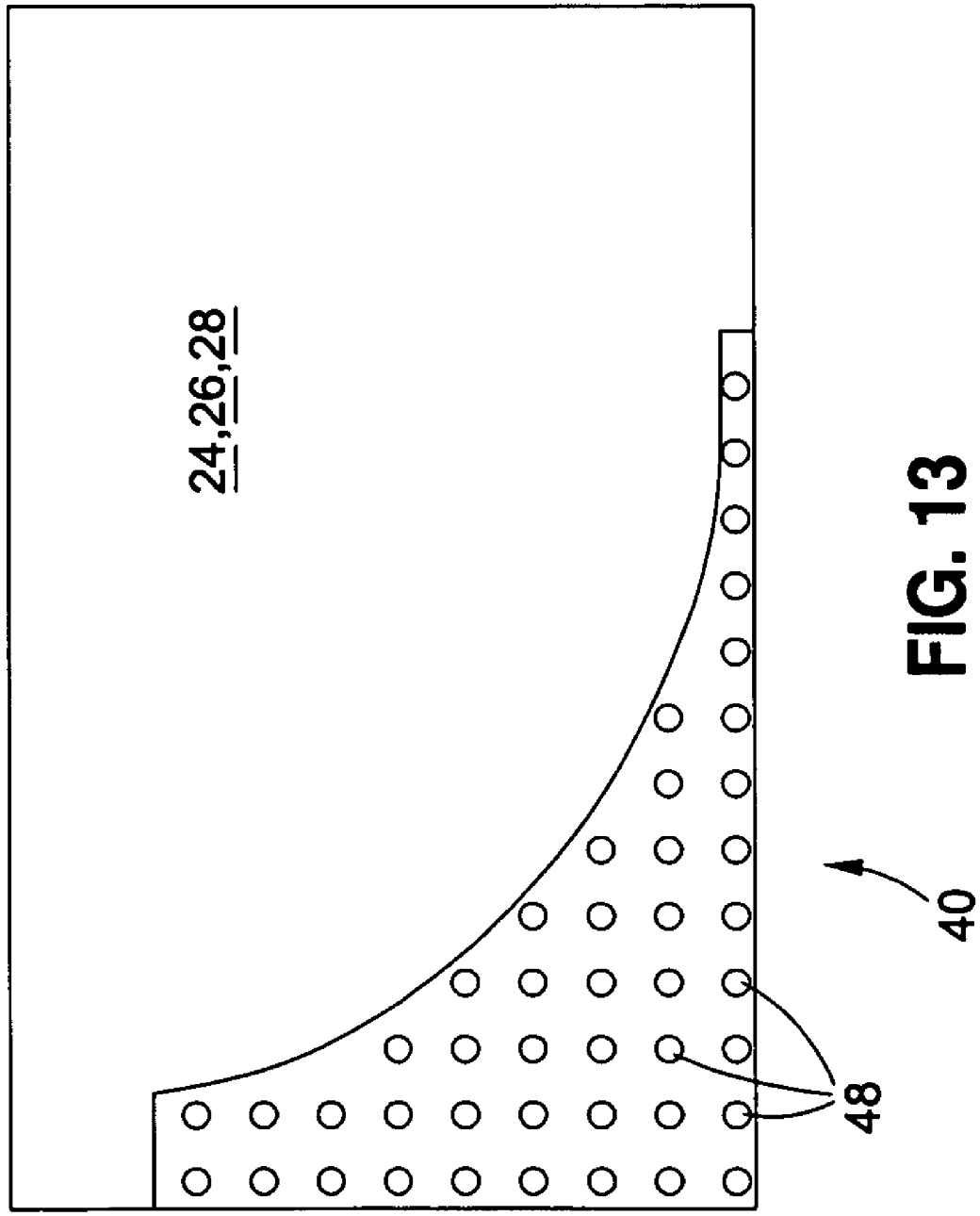

SYSTEM AND METHOD FOR VARYING THE POROSITY OF AN AERODYNAMIC SURFACE

CROSS-REFERENCE TO RELATED APPLICATIONS (Not Applicable)

STATEMENT RE: FEDERALLY SPONSORED RESEARCH/DEVELOPMENT (Not Applicable)

FIELD

The present disclosure relates generally to fluid control systems and, more particularly, to a variable porosity system for improving the aerodynamic efficiency of an aerodynamic member such as a wing or a lifting surface.

BACKGROUND

The use of passive porosity is well known in the art as a method for improving the aerodynamics and/or performance of an aircraft or other air vehicle. Generally, passive porosity comprises the application of a set of fixed openings or pores to one or more surfaces of the aircraft and may typically also include a recirculation cavity or plenum chamber located beneath the region of openings or pores. The pores and the plenum chamber allows for a conditioning of the air stream boundary layer as it passes over the porous aerodynamic surface. The plenum chamber allows the air stream to transition from a high pressure region of the aerodynamic surface to a lower pressure region.

Although its use is generally limited, one of the more common applications of passive porosity on aircraft is at the air intake or inlet of a jet engine. For example, some fighter aircraft employ passive porosity as a set of fixed holes or pores formed at the engine inlet to condition the air prior to entry into the engine. For non-porous surfaces, the boundary layer at the engine inlet may become disturbed at certain flight conditions which can disrupt the aerodynamic flow into the engine inlet. However, by providing sections of pores at strategic locations on the engine inlet, the disturbed airflow is conditioned prior to entry into the engine resulting in an improvement in engine performance.

The effects of passive porosity are documented in the reference "Computational Analysis of Drag Reduction and Buffet Alleviation in Viscous Transonic Flows Over Porous Airfoils," by Mark A. Gillan, (AIAA-93-3419) which indicates that for a given design condition, the application of passive porosity can weaken shock and improve aerodynamic efficiency. For example, when applied to a wing surface, passive porosity alters the normal shock to a lambda shockwave which spreads or distributes the shockwave over the porous region. The net effect of the lambda shockwave is an improvement in aerodynamic efficiency with a reduction in overall drag and a reduction in boundary layer thickness aft of the shockwave.

Unfortunately, the Gillan reference also concludes that while passive porosity produces a reduction in total drag above certain Mach numbers, for Mach numbers below a certain value, the porous surface actually resulted in an increase in drag compared to a solid or non-porous surface. For example, Gillan indicates that while porous surfaces reduced drag by 26 percent for Mach numbers greater than 0.79, the same porous surface produced greater drag for Mach numbers less than 0.77 as compared to a non-porous or solid surface.

Another prior art reference indicates that passive porosity can be applied to certain areas of the aircraft in order to reduce the acoustic signature or noise generated during certain flight conditions. For example, it is well known that trailing edge flap systems, when deployed, are contributors to landing noise. Such noise is typically generated as a result of vortices interacting with the flap. A reference entitled "Trailing Edge Flap Noise Reduction by Porous Acoustic Treatment," (AIAA-97-1646) by James D. Revell et al. indicates that wind tunnel testing revealed significant reductions in noise due to the application of passive porosity to portions of the flap. However, Revell further postulates that despite the noise reduction, there may be cruise drag penalties associated with the porous surfaces of the flap at cruise flight conditions.

As can be seen, the ability to apply passive porosity to aircraft has been limited due to the penalties imposed at off-design conditions. As such, there exists a need in the art for a system and method for varying the porosity of an aerodynamic surface such that the porosity provides performance, economy and environmental advantages through a wide variety of flight conditions. Furthermore, there exists a need in the art for a system and method for varying the porosity of an aerodynamic member that is of simple construction and of low cost.

SUMMARY

The present disclosure specifically addresses the above-described needs associated with passive porosity by providing a variable porosity system that may be mounted on an air vehicle in order to improve performance and/or economy, or to improve the environmental characteristics of the vehicle. The technical effects of the disclosure include the capability for varying the porosity of an aerodynamic member or modulating the porosity. In this regard, the variable porosity system allows for the porosity of the aerodynamic member to be opened at design conditions and closed at off-design conditions in order to improve overall performance through a variety of flight regimes.

In one embodiment, the variable porosity system comprises a first layer having at least one, and more preferably, a plurality of pores. The variable porosity system may further comprise a second layer having at least one, and more preferably, a plurality of pores. At least one of the first and second layers may be slidable relative to one another via an actuator mechanism. In one embodiment, the actuator mechanism may operate to move the first and second layers in a parallel direction relative to one another such that the pores of the first and second layers are movable into and out of at least partial alignment with one another in order to regulate fluid communication between the pores.

In a preferred embodiment, the variable porosity system may further include a plenum such that the first and second layers may be placed in fluid communication with the plenum when the first and second layers are moved to the open condition. The plenum may act as a recirculation chamber to allow movement of fluid from a high pressure area of the variable porosity system to a lower pressure area. In one aspect, the variable porosity system allows for high pressure air to re-energize flow in the low pressure region in order to improve the aerodynamics thereof.

Advantages of using the variable porosity system include the ability to mitigate strong transonic shock on wing surfaces or to decrease landing noise. For applications where it is desired to reduce or mitigate shock strength and location, fluid from the main air stream flow may be ported from a high pressure region to a lower pressure region in order to energize the boundary layer at high angles of attack. In this regard, the variable porosity system provides a means for reducing the tendency of the flow to separate from the wing surface. For example, the variable porosity system may be arranged to transport high pressure flow located at the leading edge lower surface to regions of low pressure at the trailing edge upper surface in order to re-energize the boundary layer and delay stall.

The variable porosity system may include the actuator mechanism which is operative to move the first and second layers relative to one another in order to move the pores in and out of alignment with one another and to regulate fluid communication therebetween and with the plenum. In one embodiment, the variable porosity system may comprise the first and second layers but may further comprise a third or more layers which cooperate to regulate fluid flow between the pores of each layer.

The pores of the first and second layers are preferably arranged in sliding abutting contact with one another. The layers are preferably constructed of low friction material and may include polymeric, metallic, or composite materials or combinations thereof. The pores of each of the layers are also preferably arranged in a substantially similar pattern. The individual pores may be provided in a wide variety of cross-sectional shapes, sizes and configurations including circular, oval, or slotted configurations. In addition, the axis of each of the pores may be oriented in a variety of inclinations and are not limited to a perpendicular orientation relative to the surface of the layers. In one embodiment, at least one of the first and second layers is substantially continuous with an outer mold line surface of an aerodynamic member such as an aircraft wing. Advantageously, arranging the layers to provide continuity of the outer mold line surfaces may prevent disruption of the aerodynamics of the wing.

In a further embodiment, the variable porosity system may comprise a set of layer assemblies of which each may include first and second layers and a plenum. The layer assemblies may be configured to be installed in sections on any aerodynamic member of the aircraft. For example, the layer assemblies may be installed in a chord-wise and/or span-wise arrangement on the aircraft wing and are also preferably configured to be moved into and out of at least partial fluid communication with one another in response to changes in flight conditions such as changes in angle of attack and flight velocity. The plenums of the layer assemblies may be fluidly isolated from one another. However, the plenums may be interconnected to one another by fluid passageways. For example, the plenums may be interconnected for arrangements where variable porosity assemblies are installed on opposing leading and trailing edges of a wing.

In a further embodiment, the variable porosity system may comprise a movable third layer having at least one pore wherein the third layer is disposable between the first and second layers. In this arrangement, the first and second layers are preferably, but optionally, non-movably fixed in position relative to one another such that the pores of the first and second layers are in at least partial alignment. The third layer may be configured to be slidable by the actuator mechanism to regulate fluid communication between the pores of the first and second layers. In such an arrangement, the third layer is preferably constructed of low friction material such as polymeric material or low friction metallic material. Low friction coatings such as anodized coatings or Teflon may also be applied to the layer sub-structure to reduce friction between the layers.

The actuator mechanism may comprise any one of the following mechanisms: hydraulic, electric, electromechanical, pneumatic, piezoelectric, shape memory mechanism (e.g., shape memory material such as shape memory alloy) or any other suitable mechanism or combination thereof. The actuator mechanism is preferably configured to modulate the frequency of the opening and closing of the pores. In one embodiment, the actuator mechanism is configured to modulate the opening and closing of the pores in correspondence to flight conditions of the aircraft including real-time and bear real-time flight conditions. For example, the actuator mechanism may modulate the opening and closing of the pores in correspondence to forward velocity, angle of attack, airframe structural response, aircraft environmental conditions, and a variety of other parameters.

The frequency with which the actuator mechanism modulates the opening and closing of the pores is preferably within the range of approximately 10 Hz to approximately 40 Hz although the modulation may occur at any frequency. In one embodiment, the modulation frequency may be complementary to the flight conditions or flight regime of the aircraft. Where the actuator mechanism is configured as a shape memory mechanism, the variable porosity system may comprise at least one shape memory alloy wire which may be configured to change length in response to a change in temperature. For example, the shape memory alloy wire may be configured to contract upon the application of heat such as due to electrical current applied to the wire. In this manner, the shape memory alloy wire may regulate movement of the first and second layers relative to one another and thereby modulate the frequency of the opening and closing of the pores.

The variable porosity system may be installed on any portion or region of any air vehicle. Such air vehicles may include, but are not limited to, any type of private, commercial, military, or space vehicle. In addition, the variable porosity system may be installed on any aerodynamic member including, but not limited to, wings and other lifting and non-lifting surfaces. Furthermore, the variable porosity system may be installed on a variety of surfaces such as engine inlets and flight control surfaces such as flaps, ailerons, elevators, elevons, rudders, stabilizers, canards, winglets, fuselage, body or any other aerodynamic member.

BRIEF DESCRIPTION OF THE DRAWINGS

These and other features of the present disclosure will become more apparent upon reference to the drawings wherein like numbers refer to like parts throughout and wherein:

FIG. 1 is a perspective view of an aircraft in one embodiment wherein a variable porosity system may be incorporated;

FIG. 2 is a sectional view taken along lines 2-7 thru 2-7 of FIG. 1 and illustrating the variable porosity system disposed toward a trailing edge of a wing of the aircraft;

FIG. 3 is a sectional view illustrating the application of the variable porosity system in one embodiment on upper and lower surfaces of the airfoil;

FIG. 4 is a sectional view of the variable porosity system as installed toward a leading edge on an outer mold line surface of the airfoil sections;

FIG. 5 is a sectional view of the variable porosity system incorporated into upper and lower surfaces toward the leading edge of the airfoil section;

FIG. 6 is a sectional view of the airfoil section illustrating the implementation of the variable porosity system extending from a lower edge of the leading edge to an upper surface toward the trailing edge of the airfoil section;

FIG. 7B is a view taken along lines 7B-7B of FIG. 7A and illustrating the pores of the first and second layers disposed in alignment with one another;

FIG. 7C is a view of the variable porosity system similar to that which is shown in FIG. 7B except wherein the pores of the first and second layers are in partial misalignment with one another;

FIG. 7D is a view of the variable porosity system illustrating the pores of the first and second layers being misaligned with one another in the closed position;

FIG. 13 is a view looking downward on a control surface such as a flap of an aircraft and illustrating the incorporation of a plurality of pores in order to reduce the acoustic signature of the aircraft.

DETAILED DESCRIPTION

Figure 7A:
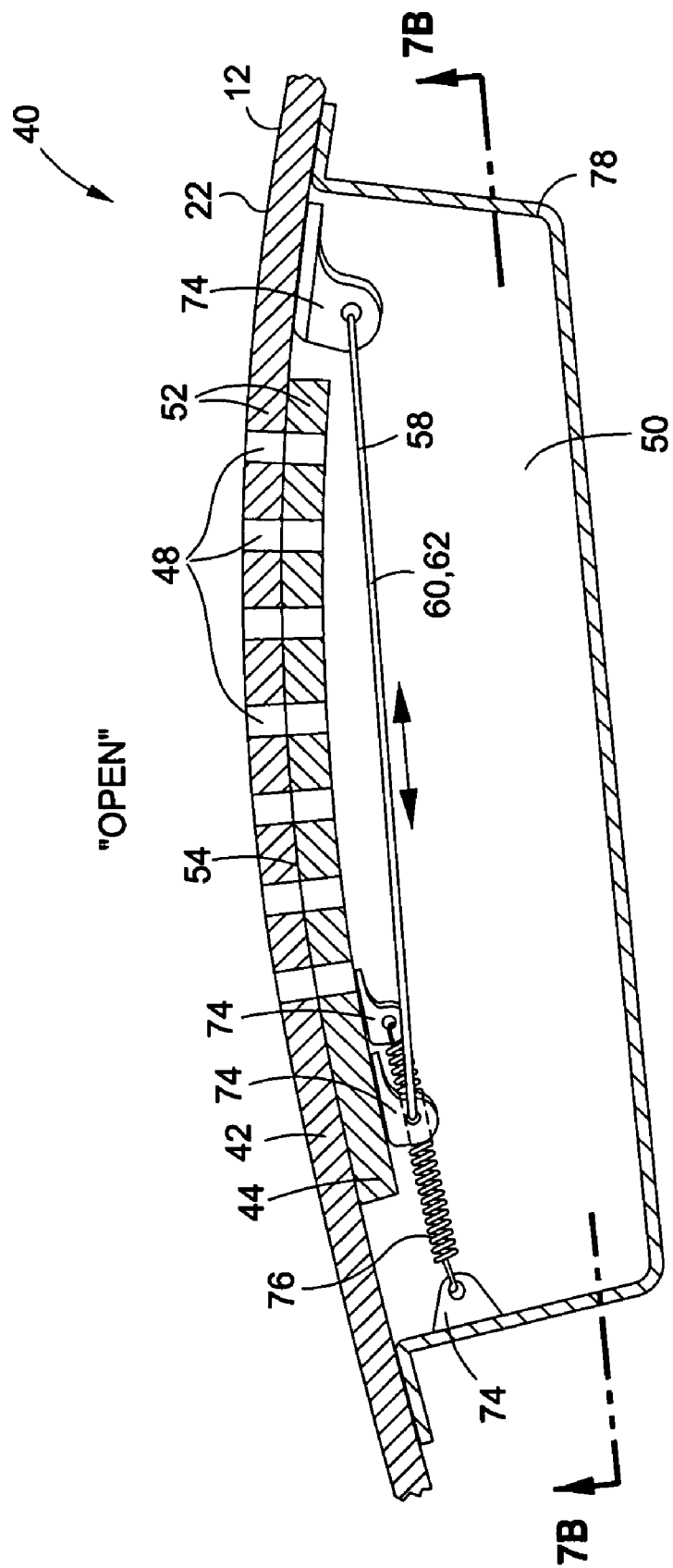
FIG. 7A is a sectional view taken along lines 7A-7A of FIG. 2 and illustrating the implementation of the variable porosity system in one embodiment and illustrating first and second layers having a plurality of pores incorporated therein.

Referring now to the drawings wherein the showings thereof are for purposes of illustrating preferred embodiments of the present disclosure and not for purposes of limiting the same, shown in FIG. 1 is an aircraft 10 which may have at least one variable porosity system 40 disposed thereon. As can be seen in FIG. 1, the aircraft 10 may be configured as a tailless aircraft in that the aircraft may have a fuselage 14 but which is not a conventional fuselage. The aircraft 10 may also lack conventional aft-mounted tail sections. Although the aircraft 10 illustrated in FIG. 1 is shown as a tailless configuration, it is recognized that the variable porosity system 40 as disclosed herein may be incorporated into any air vehicle including, but not limited to, any type of private, commercial, military or space vehicle.

For purposes of the present discussion, the variable porosity system 40 will be described with reference to the exemplary tailless aircraft 10 illustrated in FIG. 1 and, more particularly, with reference to incorporation into various aerodynamic members 12 of the aircraft 10 including, but not limited to, any aerodynamic surface and/or lifting surface such as an aircraft wing 16. However, it should be noted that the variable porosity system 40 may be applied to various surfaces which are not necessarily conventionally known as lifting surfaces. For example, it is contemplated that the variable porosity system 40 may be incorporated into various control surface 24 members such as flaps 28, ailerons 26, elevons, spliterons, or any other type of control surface 24 for control of the flight attitude of the air vehicle.

Furthermore, the variable porosity system 40 may be applied to aerodynamic members 12 that are not conventionally known as lifting surfaces or control surfaces 24. For example, as illustrated in FIG. 1, it is contemplated that the variable porosity system 40 may be applied to the propulsion system or engine 30 of an aircraft 10 such as at the engine 30 or inlets 32 as illustrated in FIG. 1. As will be apparent upon reference to the description below, the variable porosity system 40 may be provided in order to improve the performance and/or environmental characteristics of the air vehicle. For example, the variable porosity system 40 may be applied to various sections of the wing 16 of the aircraft 10 as illustrated in FIGS. 2-6 of the present application as described in detail below.

In one embodiment, the variable porosity system 40 may be incorporated into various sections of the wing 16 as a means to mitigate transonic shock or to energize certain areas of the boundary layer 34 of the wing 16 as may be desired at high angles of attack where flow has a tendency to separate. In this regard, the variable porosity system 40 may be strategically located at specific portions of the wing 16 in order to delay stall at increasing angles of attack. In another application, the variable porosity system 40 may be applied to the engines 30 of the aircraft 10 and such as is shown in FIG. 1 in order to condition the air stream prior to entry into the inlets 32 of engines 30.

The variable porosity system 40 may allow the airflow to transition from a high pressure region to a lower pressure region in order to facilitate air flow into the engine 30 inlet 32. In a still further application for environmental purposes, the variable porosity system 40 may be applied and arranged in a manner so as to reduce the acoustic signature or noise generated by the aircraft 10. For example, one source of landing noise is that which occurs at the trailing edge 20 flap 28 when the flap 28 is deployed. In this regard, the variable porosity system 40 may facilitate a reduction in noise otherwise generated by vortices interacting with the flap 28 upon landing and thereby improves the environmental characteristics of the aircraft 10.

Referring still to FIG. 1, the exemplary tailless aircraft 10 includes a pair of opposing wings 16 and having a fuselage 14 or body which is incorporated into the aircraft 10 in a blended wing configuration. Each wing 16 may have at least one set of control surfaces 24. As was earlier mentioned, such control surfaces 24 may comprise a variety of configurations including, but not limited to, flaps 28, ailerons 26, and other control devices. In addition, the aircraft 10 is illustrated as having a plurality of engines 30 each having an engine inlet 32 to which the variable porosity system 40 may also be applied.

Referring to FIGS. 2 and 7A, shown is the variable porosity system 40 applied to a trailing edge 20 portion on an upper side of the wing 16 of the aircraft 10. The variable porosity system 40 may comprise a first layer 42 having at least one pore 48 and a second layer 44 also having at least one pore 48. Each of the first and second layers 42, 44 is preferably slidable relative to one another and may be disposed in abutting contact with one another. The first and second layers 42, 44 are movable relative to one another in order to move the pores 48 into fluid communication with one another. To facilitate such relative movement, the variable porosity system 40 may include an actuator mechanism 58 which is operative to move the first and second layers 42, 44 along a parallel direction relative to one another such that the pores 48 are movable into and out of at least partial alignment with one another.

The variable porosity system 40 may include a plenum 50 to allow for recirculation of the air passing thereinto. The plenum 50 may act as a recirculation chamber to allow movement of fluid from a high pressure area on an exterior of the variable porosity system 40 to a lower pressure area on an exterior of the variable porosity system 40. In one aspect, the variable porosity system 40 allows for high pressure air to re-energize flow in the low pressure region in order to improve the aerodynamics thereof. For example, when the pores 48 are in at least partial alignment with one another, the fluid may pass from an exterior of the wing 16 to the interior of the plenum 50 wherein the fluid may then re-circulate within the plenum 50 and exit the plenum 50 at a low pressure area on an exterior of the wing.

Referring still to FIG. 2, shown is a shockwave 36 which may develop at certain areas of the wing 16 at specific Mach numbers and depending upon the flight conditions. Due to the addition of the passive porosity system 40, the shockwave 36 may be dampened in that the shockwave 36 forms a lambda structure which smears or spreads the shock over a wider area than that which would occur without the variable porosity system 40. In this regard, the variable porosity system 40 induces the recirculating flow 38 within the plenum 50 and results in an increase in fluid communication across the shockwave 36. The resulting lambda structure spreads the shockwave 36 in order to minimize drag and facilitate attached flow 72 at locations aft of the shockwave 36.

The incorporation of the variable porosity system 40 may facilitate a reduction in buffeting of the aircraft 10. Likewise, the incorporation of the variable porosity system 40 may facilitate a reduction in structural requirements or strength capabilities of the airframe resulting in an increase in the gross takeoff weight capability of the aircraft 10. Performance improvements resulting from the incorporation of the variable porosity system 40 may also include a reduction in fuel consumption due to reduced structural weight of the aircraft 10 and improvements in the lift-to-drag (L/D) ratio, as well as other advantages.

Referring to FIG. 3, shown is an airfoil section taken along lines 2-7 thru 2-7 of FIG. 1 and illustrating the incorporation of the variable porosity system 40 at upper and lower sides of the wing 16 adjacent the trailing edge 20. As can be seen in FIG. 3, the variable porosity system 40 includes the plenum 50 which may be common to the variable porosity assemblies located at each of the upper and lower surfaces at the trailing edge 20. However, it should be noted that each variable porosity system 40 may be provided with its own plenum 50 with fluid communication between the plenums 50 being facilitated by at least one fluid passageway 56 such as that which is illustrated in FIG. 6.

More particularly, FIG. 6 illustrates the variable porosity system 40 installed at a lower side of the leading edge 18 of the wing 16 and utilizing a fluid passageway 56 to fluidly communicate with the variable porosity system 40 disposed on the upper side of the wing 16 adjacent the trailing edge 20. In the arrangement of FIG. 6, the variable porosity system 40 facilitates the porting of high pressure air at the lower side of the leading edge 18 of the wing 16 to the lower pressure area at the trailing edge 20, as will be described in greater detail below.

Referring to FIG. 3, shown is the variable porosity system 40 incorporated into upper and lower sides of the wing 16 adjacent the trailing edge 20. High pressure airflow may be ported from the lower side of the wing 16 to the lower pressure region at the upper side of the wing 16 in order to energize the upper surface boundary layer 34 at high angles of attack or during conditions where the flow has a tendency to separate from the wing. As can be seen in FIG. 3, the plenum 50 provides a means for fluid communication between the variable porosity systems 40 located on the upper and lower sides of the wing 16.

FIG. 7A illustrates one embodiment of the first and second layers 42, 44 of the variable porosity system 40. As can be seen, each one of the first and second layers 42, 44 has a plurality of pores 48 which may be arranged in similar patterns. The layers are slidable relative to one another. The first layer 42 may be continuous with the outer mold line 22 surface of the wing 16 as shown in FIG. 2. In this regard, the first layer 42 may comprise the outer wing 16 skin with the second layer 44 being provided as an additional component and comprising the slidable portion of the variable porosity system 40. The area beneath the first and second layers 42, 44 may comprise the plenum 50 which may be formed by a suitable enclosure 78 which may be attached to an underside of the wing 16 skin or which may be secured to any other portion of the wing 16 in any suitable manner. The enclosure 78 may be provided in any arrangement and in any size, shape, or configuration and is not limited to that which is shown in FIG. 7A.

The variable porosity system 40 may further comprise the actuator mechanism 58 which, as shown in the exemplary embodiment of FIG. 7A, may comprise a shape memory mechanism 60 such as shape memory material. The shape memory mechanism 60 may comprise a set of wires formed of shape memory alloy 62 material which, when heat is applied such as via electric current, results in a contraction of the length of the wire and causing movement of the second layer 44 relative to the first layer. Although the actuator mechanism 58 is shown in FIG. 7A as comprising the shape memory mechanism 60, it is recognized herein that the actuator mechanism 58 may comprise any one of a variety of different mechanisms suitable for facilitating relative movement of the first and second layers 42, 44. For example, the actuator mechanism 58 may comprise a hydraulic mechanism and/or any one of the following mechanisms or combinations thereof: electric, electromechanical, pneumatic, piezoelectric, and any other mechanisms suitable for providing movement of the first layer 42 relative to the second layer.

Referring to FIGS. 7B-9B, each of the pores 48 of the first and second layers 42, 44 may be arranged in a generally rectangular or orthogonal pattern. In addition, the pores 48 may be provided in similar quantity and orientation. However, the pores 48 may be provided in a variety of cross-sectional shapes, sizes, and configurations as well as in a variety of orientations or inclinations.

Figure 11A:
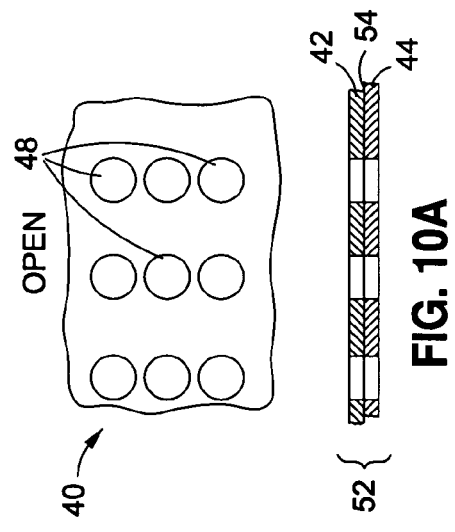
FIG. 11A is a view illustrating the pores configured in a slot arrangement and illustrating the pores of the first and second layer in alignment with one another in the open condition.
Figure 11B:
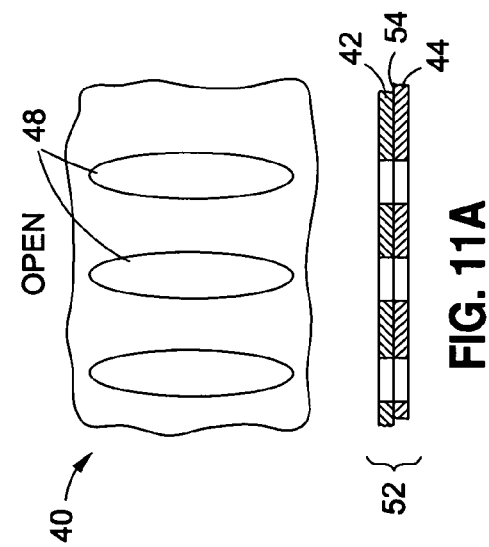
FIG. 11B is a view of the slots of the first and second layers in misalignment with one another such that the variable porosity system is in the closed condition.

For example, although shown as having a generally circular cross-sectional shape, it is contemplated that the pores 48 in the first and second layers 42, 44 may be provided in an oval or slot arrangement as illustrated in FIGS. 11A-11B. Preferably, the spacing between the pores 48 is less than 50% in that that the total area of the pores 48 is less than 50% of the total area of the surface area into which the pores 48 are installed. In this regard, such an arrangement provides adequate area for covering opposing pores 48 in the first and second layers 42, 44 such that the fluid communication between the layers may be completely turned on or off. However, the pores 48 may be arranged in any amount of coverage relative to surface area.

Referring to FIGS. 11A-11B, it is also contemplated that although the pores 48 may be provided in a variety of shapes and patterns, the orientation of the pores and/or slots may be provided in a variety of different inclinations. For example, the axis of the pores 48 may be oriented to extend at an angle through the first and second layers 42, 44 other than the perpendicular arrangement shown in FIGS. 11A-11B. Furthermore, the axis of the pores 48 may be such that the pores 48 are oriented to face in any direction relative to the direction of air flow passing thereby. In this regard, the inclination of the pores 48 may be tailored to the specific location on the aircraft 10 as well as to the different flight conditions encountered.

Referring briefly to FIG. 4, shown is the variable porosity system 40 implemented on an upper side of the wing 16 toward a leading edge 18. The installation shown in FIG. 4 may be desirable in conditioning the airflow by transferring the high pressure air at a forward end of the variable porosity system 40 to the lower pressure region as shown in order to energize the boundary layer 34 downstream. The re-energization of the flow may delay boundary layer 34 separation and thereby delay stall. FIG. 5 illustrates an implementation of the variable porosity system 40 on opposing upper and lower sides of the wing 16 at the leading edge 18. Such an installation may be desirable in order to divert high pressure flow from a lower side of the wing 16 to a low pressure area of the wing 16 on an upper side of the wing.

FIG. 6 illustrates an implementation of the variable porosity system 40 at a lower side of the wing 16 at the leading edge 18. The arrangement of FIG. 6 facilitates the transfer of high pressure air to the low pressure trailing edge 20 on the upper side of the wing 16 in order to re-energize the boundary layer 34. It should be noted that the implementations of the variable porosity system 40 in FIGS. 2-6 are exemplary only and are not intended to represent the extent of arrangements in which the variable porosity system 40 may be implemented. For example, as was indicated above, it is contemplated that the variable porosity system 40 may be implemented on a variety of aerodynamic members 12 and is not limited solely to wings 16 or lifting surfaces.

Referring briefly to FIG. 7A-7D, shown is the variable porosity system 40 in an embodiment utilizing the shape memory mechanism 60 as the operating mechanism for inducing slidable relative motion between the first and second layers 42, 44. As shown in FIG. 7A, the variable porosity system 40 comprises the first layer 42 which, in one aspect, may be substantially continuous with an outer mold line 22 surface of the wing 16 or other aerodynamic member 12. However, it is contemplated that the first layer 42 may comprise a separate component which may be generally continuous with the outer mold line 22 surface of the aerodynamic member 12.

It is contemplated that the first layer 42 may be configured to be non-movable or is fixed in position relative to the aerodynamic member 12 with the second layer 44 being configured to be movable or operative by the actuator mechanism. In this regard, the variable porosity system 40 may comprise a pair of the layer assemblies 52 with each layer assembly 52 including the first and second layers 42, 44 and a plenum 50. The plenums 50 of the layer assemblies 52 may be interconnected by the fluid passageway 56 such as that which is illustrated in FIG. 6. Furthermore, as shown in FIG. 1, it is contemplated that the layer assemblies 52 may be configured to be installed in spaced in relation to one another.

For example, FIG. 1 illustrates a variable porosity system 40 installed at the leading edge 18 and a variable porosity system 40 installed at the trailing edge 20. Each of the layer assemblies 52 is generally aligned with one another along the chord line of the wing 16 although non-aligned installations are contemplated. In addition, it is contemplated that the layer assemblies 52 may be installed in a span-wise arrangement on the aircraft 10 wing. In all configurations, each of the layer assemblies 52 may be configured to be openable in order to allow fluid communication between the first and second layers 42, 44 at different flight conditions. For example, the layer assemblies 52 may be configured to be openable in response to changes in angle of attack of the aircraft 10.

Furthermore, the layer assemblies 52 may be configured to be openable at different times relative to other layer assemblies 52 installed on the same aircraft 10. For example, the layer assemblies 52 may be configured to be opened in succession from the leading edge 18 to the trailing edge 20 as angle of attack increases. Likewise, the layer assemblies 52 may be configured to be opened in sequence from inboard to outboard for span-wise installations on the wing. It is further contemplated that the variable porosity system 40 be installed on various other locations on the aircraft 10. For example, the variable porosity assemblies may be installed in spaced arrangement such as in sections on the fuselage 14/body of the aircraft 10 or adjacent the engine 30 inlet 32.

Regarding the construction of the variable porosity system 40, it is preferable that the materials are easily slidable against one another. In this regard, the layers 42, 44 preferably exhibit low coefficients of sliding friction at least at the interface 54 portion between the layers in order to facilitate sliding movement. Moreover, it is contemplated that the actuator mechanism 58 is operative to move the first and second layers 42, 44 between open, partially open, and closed conditions. For example, as shown in FIG. 7B, the first and second layers 42, 44 are shown with the pores 48 being in substantial alignment with one another in the open condition. FIG. 7C illustrates a partial overlap of the pores 48 of the first and second layers 42, 44 such that the pores 48 are in partial fluid communication with one another and are therefore in a partially open condition. FIG. 7D likewise illustrates an orientation wherein the first and second layers 42, 44 are moved such that the pores 48 are out of fluid communication with one another such that the pores 48 are in a closed condition.

As was earlier mentioned, the actuator mechanism 58 illustrated in FIG. 7B-7D is an exemplary embodiment of a shape memory mechanism 60. More specifically, FIG. 7A illustrates the shape memory mechanism 60 as being comprised of a set of shape memory allow wires which, upon application of electrical current, cause the shape memory alloy wires to contract as heat is applied. The variable porosity system 40 may further comprise biasing members such as springs 76 which, in one embodiment, may be disposed within the plenum 50 and fixed via brackets 74 or via other suitable fixing means. The springs 76 may be configured as any suitable biasing member arrangement and are not necessarily limited to tension springs 76 as illustrated in FIG. 7A.

As indicated above, when heat is applied, the shape memory mechanism 60 may contract causing the second layer 44 to move parallel to the first layer 42 and moving the pores 48 into and out of fluid communication with one another. By controlling the temperature of the shape memory alloy 62 wires, the porosity can be modulated to be open, partially open, or fully closed as shown respectively in FIGS. 7B-7D. In this regard, FIGS. 7B-7D illustrate a system incorporating an arrangement of parallel, opposed springs 76 and shape memory alloy 62 wires which are interconnected to the first and second layers 42, 44 as shown. Although only two (2) springs 76 and three (3) wires are shown, any number may be provided and in any arrangement.

Figure 8B:
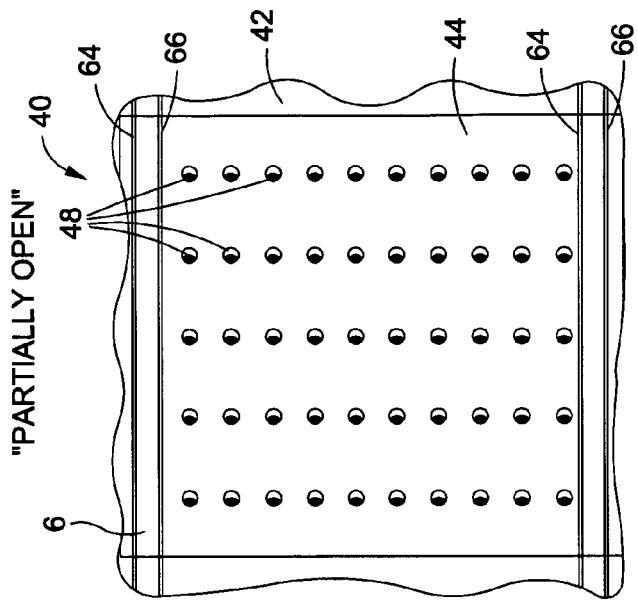
FIG. 8B is a view of the variable porosity system similar to that which is shown in FIG. 8A and illustrating the pores of the first and second layers in partial misalignment with one another.
Figure 8C:
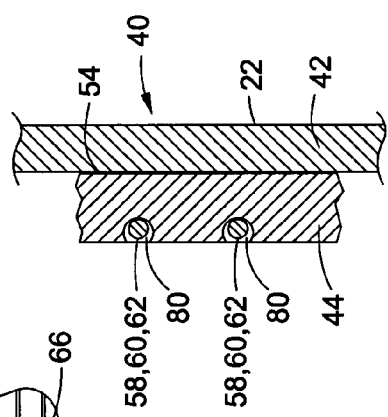
FIG. 8C is a sectional view taken along lines 8C-8C of FIG. 8A and illustrating a shape memory alloy wire installed into a pair of grooves of the second layer for operatively regulating the opening and closing of the first and second layers.
Figure 8A:
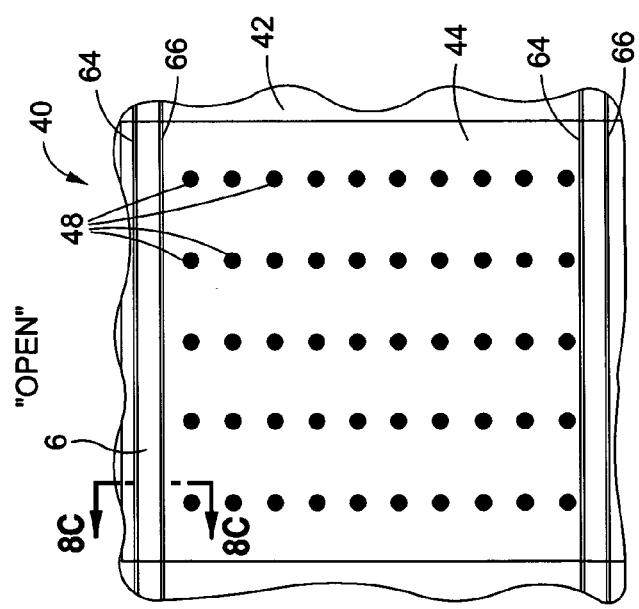
FIG. 8A is a view of the variable porosity system in a further embodiment illustrating the incorporation of a shape memory mechanism for regulating the opening and closing of the pores of the first and second layer.

Referring to FIGS. 8A-8C, shown is an embodiment of the variable porosity system 40 wherein the shape memory alloy 62 wires are embedded in grooves 80 best seen in FIG. 8C. Two pairs of wires 64, 66 are arranged in an antagonistic configuration which facilitates opening and closing of the porosity between the first and second layers 42, 44. For example, the first pair 64 of shape memory alloy 62 wires, when heated, contract and cause the pores 48 of the first and second layers 42, 44 to move out of fluid communication with one another while simultaneously stretching the second pair 66 of shape memory allow wires. Likewise, the second pair 66 of shape memory alloy 62 wires, when heated, contract and cause sliding movement of the first and second layers 42, 44 such that the pores 48 are moved into alignment with one another allowing 16 fluid communication therebetween. The embedding of the shape memory alloy 62 wires into the grooves 80 provides a low profile configuration which may minimize interference with other components of the aircraft 10 wing.

The antagonistic configuration of the shape memory alloy 62 wires may be provided in a zero-power arrangement wherein the shape memory alloy 62 wires are trained such that they stretch when the aircraft 10 is on the ground at relatively high temperatures and then contract as the aircraft 10 gains altitude and external temperatures typically decrease. Likewise, it is contemplated that the actuator mechanisms 58 is configured to modulate the frequency of the opening and closing of the pores 48 with respect to different flight conditions of the aircraft 10 such as during changes in forward velocity, angle of attack, airframe structural response, aircraft environmental conditions, and a variety of other parameters.

Figure 9B:
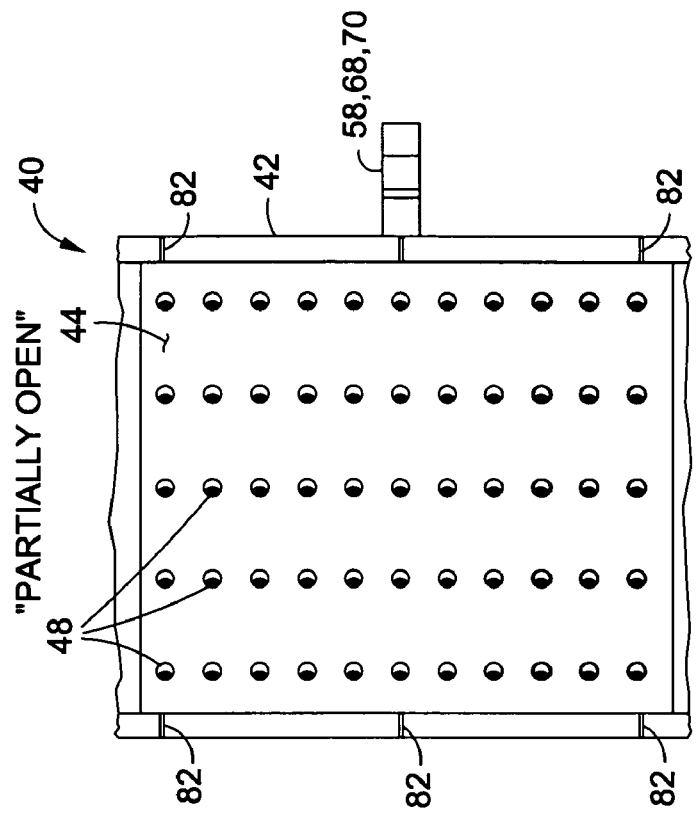
FIG. 9B is a view similar to that which is shown in FIG. 9A illustrating the pores of the first and second layers in partial misalignment with one another.
Figure 9A:
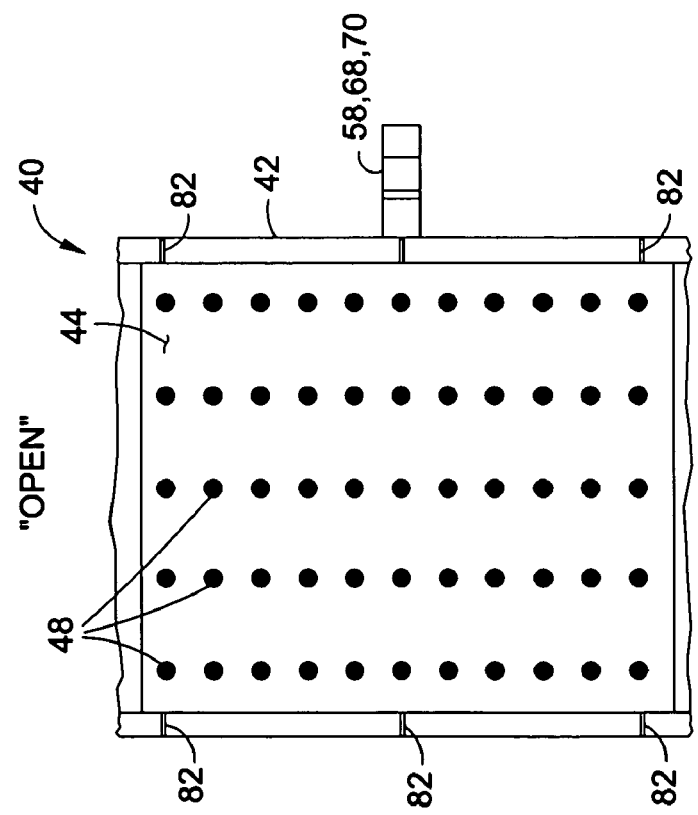
FIG. 9A is a view of the variable porosity system in a further embodiment illustrating the application of a solenoid or actuator for operatively regulating the opening and closing of the first and second layers.
Figure 10A:
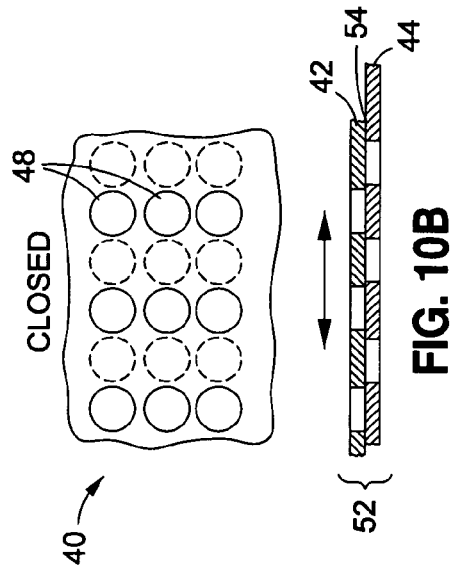
FIG. 10A is a view and cross-sectional view of an exemplary set of pores of a first and second layer wherein the pores are in alignment with one another in the open condition.
Figure 10B:
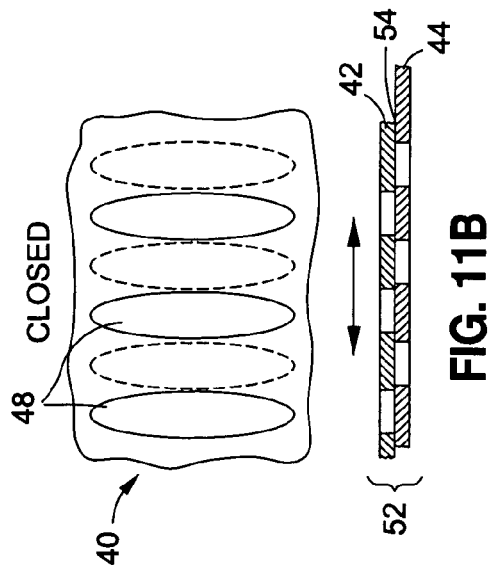
FIG. 10B is a cross-sectional view of the first and second layer shown in FIG. 10A and illustrating the pores in misalignment with one another such that the variable porosity system is in a closed condition.

Referring now to FIGS. 9A-9B, shown is the variable porosity system 40 implemented in an alternative embodiment wherein the first and second layers 42, 44 are moved relative to one another via the actuator mechanism 58 or solenoid. As was indicated earlier, such actuator mechanism 58 may comprise a variety of alternative configurations including, but not limited to, hydraulic, electromechanical, pneumatic, piezoelectric, shape memory mechanism 60 or a variety of other arrangements. For the configurations shown in FIGS. 9A-9B, the actuator mechanism 58 may also be provided as a solenoid or as a high frequency piezoelectric stack 68.

A plurality of guide pins 82 may be included between the first and second layers 42, 44 and/or surrounding structural components in order to facilitate alignment of the layers during slidable movement. The guide pins 82 may slide relative to a pair of complementary bores formed in the formed in the first and/or second layers. Modulation of the variable porosity system 40 may be performed at a very low frequency as may be provided by the shape memory mechanism 60 (i.e., shape memory alloy 62 wire) system described above or via a high frequency device such as a solenoid or high speed actuator. For embodiments employing a high frequency piezoelectric stack 68, a displacement amplifier 70 such as an X-frame (i.e., scissors arrangement) may be provided in order to multiple the relatively small displacements produced the piezoelectric stack 68 into the larger displacements necessary to move the pores 48 into and out of alignment.

In one embodiment, it is contemplated that the actuator mechanism 58 is operative to modulate the frequency of slidable movement at a frequency range of approximately 10 Hz to approximately 40 Hz. Furthermore, it is contemplated that the actuator mechanism 58 is configured to move the pores 48 in and out of fluid communication or in and out of partial fluid communication with one another. In this regard, the degree of fluid communication between the pores 48 may be variable relative to the flight conditions of the aircraft 10.

Figure 12B:
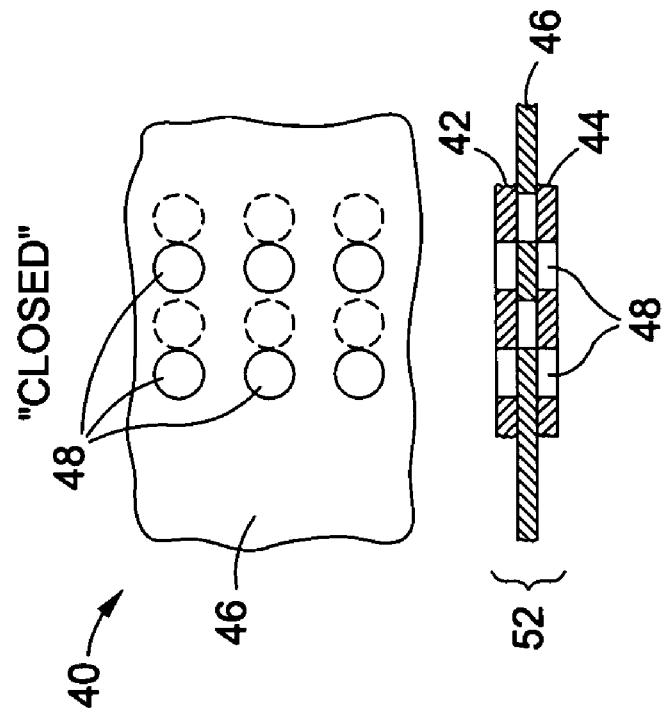
FIG. 12B is a view of the variable porosity system incorporating first, second, and third layers and illustrating the third layer being moved into a closed position to prevent fluid communication between the first and second layers.
Figure 12A:
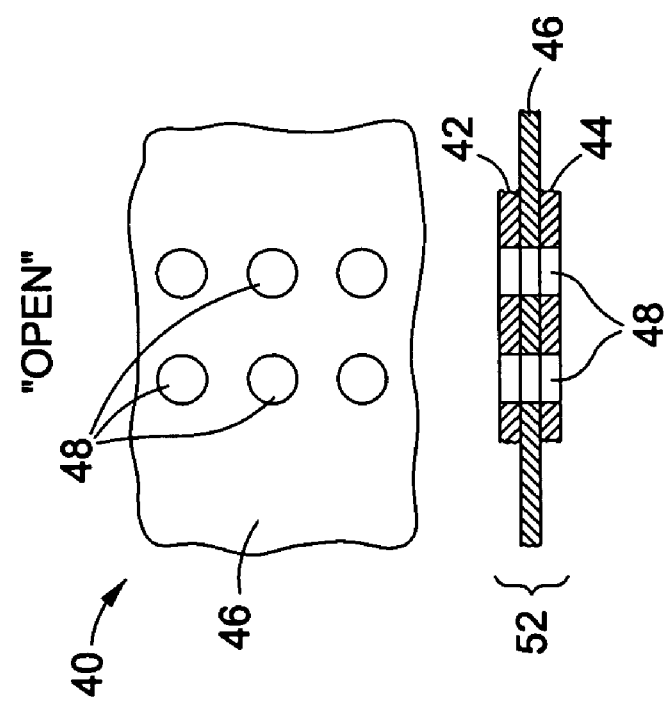
FIG. 12A is a view of the variable porosity system incorporating first, second, and third layers wherein the third layer is disposed between the first and second layers and is operative to be moved relative thereto in order to alter the open and closed fluid communication between the first and second layers.

Referring briefly to FIGS. 12A-12B, shown is a further embodiment of the variable porosity system 40 illustrating an arrangement having first, second, and third layers 42, 44, 46 with the first and second layers 42, 44 being arranged in non-movable or fixed relationship with one another such that the pores 48 thereof are in general alignment with one another. The third layer 46 preferably includes at least one pore 48 and/or a plurality of pores 48 disposed of in a pattern which is complementary to the pattern of pore 48 in the first and second layers 42, 44.

As shown in FIGS. 12A-12B, the third layer 46 is preferably disposable between the first and second layers 42, 44 and is configured to be slidable by the actuator mechanism. In this regard, movement of the first and second layer 44 causes the fluid communication to be in an open condition as shown in FIG. 12A or in a closed condition as shown in FIG. 12B or in any intermediate position of alignment therebetween.

Referring to FIG. 13, shown is an arrangement for the variable porosity system 40 illustrating a plurality of pores 48 installed in a control surface 24 such as the control surface 24 illustrated with the aircraft 10 in FIG. 1. As was indicated earlier, the application of porosity to the control surface 24 may improve the acoustic signature (i.e., reduce noise) of the aircraft 10 at specific flight conditions such as during approach and landing when vortices interacting with flaps 28 tend to generate noise. In this regard, the variable porosity system 40 may be configured to be moved into the closed condition for normal flight conditions other than landing and, upon approach or when the flaps 28 are deployed, moved into an open configuration in order to reduce the acoustic signature.

As was indicated above, the first and second layers 42, 44 are preferably comprised of multiple layers of porous material that are stacked such that the pores 48 align with one another and allow fluid to completely pass therethrough in the open condition. For the arrangement shown in FIGS. 12A-12B, the third layer 46 is preferably porous and, in general, may be fabricated from material that has a low coefficient of friction and, in this regard, it is preferably fabricated of material of polymeric material. The third layer 46 may be arranged such that areas between the pores 48 will block air flow between the first and second layer 44 in order to change the variable porosity system 40 to a non-porous surface.

Advantageously, the variable porosity system 40 may improve aerodynamic performance by adding high pressure air to regions of low pressure which, for example, can weaken shockwaves and/or reduce the boundary layer 34 thickness. As such, the variable porosity system 40 provides beneficial effects at off-design conditions as well as during design conditions and allows for the modulation of porosity corresponding to the given design condition.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A variable porosity system for an air vehicle, comprising:
    a layer assembly, including:
        a first layer having at least one pore;
        a second layer having at least one pore;
        a shape memory mechanism including at least one wire configured to change length in response to a change in ambient temperature without active heating to move the first and second layers relative to one another such that the pores move into and out of at least partial alignment with one another with changes in ambient temperature; and
        a plenum disposed adjacent the first and second layers;
    the layer assembly being configured to passively transfer air through the plenum when the pores of the first and second layers are at least partially aligned with one another.

2. The variable porosity system of claim 1 wherein the first and second layers are arranged in slidably abutting contact with one another.

3. The variable porosity system of claim 1 wherein at least one of the first and second layers is substantially continuous with an outer mold line surface of an aerodynamic member.

4. The variable porosity system of claim 1 further comprising:
    a fluid passageway; and
    a pair of the layer assemblies each including the first and second layers and a plenum;
    wherein the plenums of the layer assemblies are interconnected by the fluid passageway.

5. The variable porosity system of claim 4 wherein the layer assemblies are disposed in spaced relation on an aircraft wing in at least one of a chordwise and a spanwise arrangement.

6. The variable porosity system of claim 5 wherein the layer assemblies are configured to be openable in response to changes in angle of attack of the aircraft wing.

7. The variable porosity system of claim 1 wherein the actuator mechanism comprises at least one of the following mechanisms: hydraulic, electric, electromechanical, pneumatic, piezoelectric, shape memory mechanism.

8. The variable porosity system of claim 7 wherein the actuator mechanism comprises a shape memory mechanism including at least one wire configured to change length in response to electrical heating of the wire.

9. The variable porosity system of claim 7 wherein:
    the actuator mechanism comprises a shape memory mechanism configured as a first and second pair of wires connected to the first and second layers;
    the first pair of wires being configured to contract when heated to cause the pores of the first and second layers to be moved out of fluid communication with one another;
    the second pair of wires being arranged such that the contraction of the first pair of wires causes stretching of the second pair of wires;
    the second pair of wires being configured to contract when heated to cause the pores of the first and second layers to be moved into fluid communication with one another.

10. The variable porosity system of claim 1 wherein the actuator mechanism is configured to modulate a frequency of the opening and closing of the pores with respect to flight conditions of an aircraft.

11. A variable porosity system for an air vehicle, comprising:
    a layer assembly, including:
        a first layer having at least one pore;
        a second layer having at least one pore;
        a third layer having at least one pore and being disposable between the first and second layers;
        a shape memory mechanism connected to the third layer and including at least one wire configured to change length in response to a change in ambient temperature without active heating; and
        a plenum disposed adjacent the first, second and third layers;
    wherein:
        the first and second layers being fixed in position relative to one another such that the pores of the first and second layers are in general alignment;
        the third layer being configured to be slidable by the shape memory mechanism such that the pore thereof is movable into at least partial alignment with the pores of the first and second layers with changes in ambient temperature;
        the layer assembly being configured to passively transfer air through the plenum when the pore of the third layer is at least partially aligned with the pores of the first and second layers.

12. An aircraft, comprising:
    an aerodynamic member having a layer assembly, including:
        a first layer having at least one pore and being disposed on the aerodynamic member;
        a second layer having at least one pore and being slidable relative to the first layer and being disposed on the aerodynamic member;
        a shape memory mechanism including at least one wire configured to change length in response to a change in ambient temperature without active heating to move the first and second layers along a parallel direction relative to one another such that the pores move into and out of at least partial alignment with one another with changes in ambient temperature; and
        a plenum disposed adjacent the first and second layers;
    the layer assembly being configured to passively transfer air through the plenum when the pores of the first and second layers are at least partially aligned with one another;
    at least one of the first and second layers being substantially continuous with an outer mold line surface of the aerodynamic member.

13. The aircraft of claim 12 wherein the actuator mechanism comprises at least one of the following mechanisms: hydraulic, electric, electromechanical, pneumatic, piezoelectric, shape memory mechanism.

14. The aircraft of claim 13 wherein the actuator mechanism comprises a shape memory mechanism configured as a first and second pair of wires connected to the first and second layers;
the first pair of wires being configured to contract when heated to cause the pores of the first and second layers to be moved out of fluid communication with one another;
the second pair of wires being arranged such that the contraction of the first pair of wires causes stretching of the second pair of wires;
the second pair of wires being configured to contract when heated to cause the pores of the first and second layers to be moved into fluid communication with one another.

15. The aircraft of claim 12 wherein the actuator mechanism is configured to modulate a frequency of the opening and closing of the pores with respect to flight conditions of the aircraft.

16. A method of modulating the porosity of an aerodynamic member having first and second layers each including pores formed therein and being fluidly coupled by a plenum disposed adjacent to the first and second layer, the first and second layers being slidable relative to one another, the method comprising the steps of:
coupling a wire of a shape memory mechanism to one of the first and second layers;
changing a length of the wire in response to a change in ambient temperature without active heating;
moving at least one of the first and second layers relative to one another to move the pores thereof into and out of at least partial alignment with one another in response to a chance in the length of the wire; and
passively transferring air through the plenum when the pores of the first and second layer are at least partially aligned with one another.

17. The method of claim 16 wherein the aerodynamic member includes an actuator mechanism connected to at least one of the first and second layers, the method further comprising the step of:
modulating a frequency of the opening and closing of the pores with respect to flight conditions of an aircraft.

18. The method of claim 16 wherein the aerodynamic member includes a plenum, the method further comprising the step of:
moving the first and second layers along a parallel direction relative to one another such the pores thereof are moved into and out of fluid communication with the plenum.

19. The method of claim 16 wherein the aerodynamic member includes a plurality of the layer assemblies configured to be installed on an aircraft wing in at least one of a chordwise and a spanwise arrangement, the method further comprising the step of:
opening the layer assemblies in response to changes in angle of attack of the aircraft wing.

* * * * *